Feb. 13, 1940.    A. J. FISCHER    2,190,598
DIGESTION OF SEWAGE SLUDGE
Filed June 21, 1935
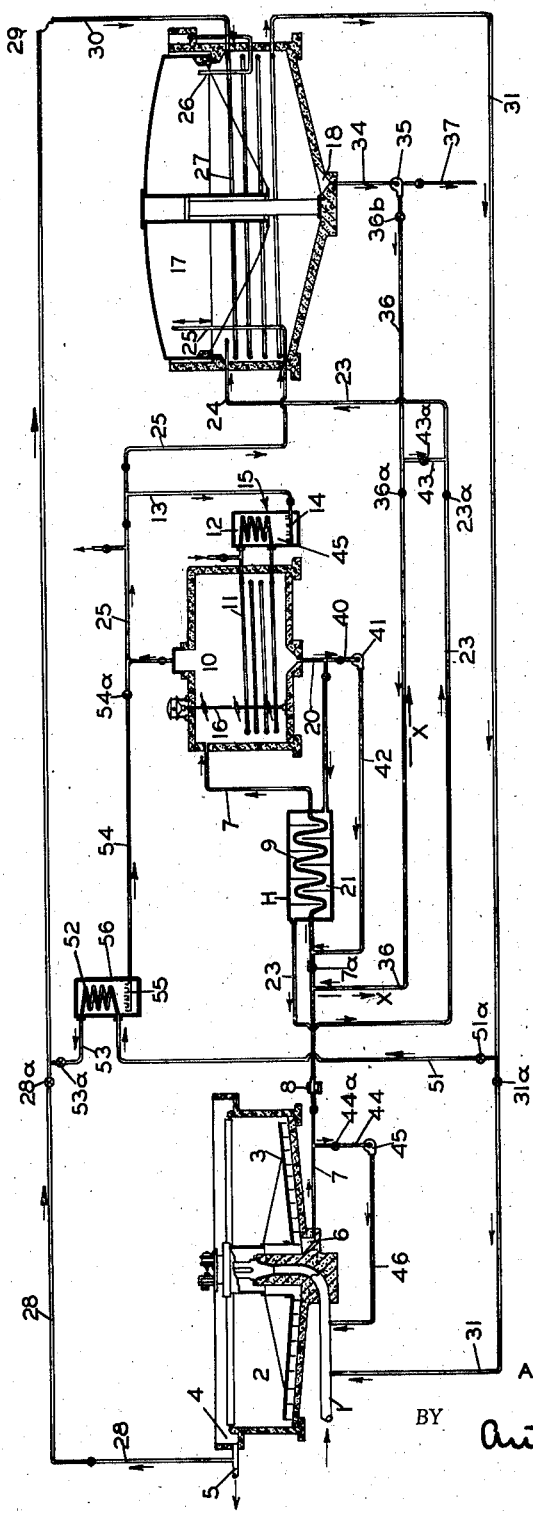
INVENTOR.
ANTHONY J. FISCHER
BY *Arthur Middleton*
ATTORNEY.

Patented Feb. 13, 1940

2,190,598

UNITED STATES PATENT OFFICE 2,190,598

DIGESTION OF SEWAGE SLUDGE

Anthony J. Fischer, Jackson Heights, Long Island, N. Y., assignor to The Dorr Company, Inc., New York, N. Y., a corporation of Delaware Application June 21, 1935, Serial No. 27,627

12 Claims. (Cl. 210—2)

The invention relates to the treating of sludge derived from sewage, trade wastes and other polluted waters. The invention particularly revolves about the treating of such sludge by a method and apparatus in which the raw or fresh sludge to be treated is from time to time, according to operative requirements, passed to and into a relatively small body of sludge undergoing anaerobic thermophilic digestion and which is maintained, for example, in amount which would be equal to that requisite for approximately a two- to five-day detention period therefor. Therefrom, and generally according to operative requirements, the sludge from this small body of digesting sludge is passed to and into a maintained larger body of sludge wherein anaerobic non-thermophilic digestion can be carried out, thus completing the requisite sludge digestion. This larger body is, for example, in amount approximately equal that requisite for a twenty- to thirty-day detention period where no substantial storage capacity is desired beyond that requisite for normal digestion requirements. Where there is desired storage capacity substantially beyond that requisite for normal digestion requirements, then the larger body may be, for example, in an amount approximately equal to that requisite for a thirty- to sixty-day detention period for the sludges. As to both the small and large bodies of sludge, care is exercised to insure that each be maintained in an alkaline condition and within temperature ranges favorable to the particular type of anaerobic digesting to which the particular body of sludge is exposed and is undergoing. The process and apparatus which is the subject of the present invention has in view the carrying out of the operations in such a manner that the larger body of sludge can be relied upon and employed to maintain or create alkaline conditions in the smaller body of sludge should, for any reason, the smaller body tend to or even pass into an acid condition from the normally desired alkaline condition.

Thermophilic digestion of sludge is the carrying out of a sludge digestion at what may be considered relatively high temperatures, namely, at an optimum temperature of 130 degrees Fahrenheit. While this type of sludge digestion has been proposed, it has never come into commercial or practical use, and sludge digestion as ordinarily practiced and carried out has been a non-thermophilic digestion, which may be and is referred to herein as mesophilic digestion, and which is carried out for most sludges at an optimum temperature of approximately 90 degrees Fahrenheit.

Sewage sludge contains solid ingredients which when heated to a temperature of 90 degrees Fahrenheit tend to a bacterial flora of one type which favorably develop at this temperature during the carrying out of what is hereinafter referred to as anaerobic non-thermophilic digestion. In the sludge when heated to a higher degree, there develops a bacterial flora of a higher type which flourishes and aids in the performing of what is herein referred to as the anaerobic thermophilic digestion.

As sewage sludge is heated above the optimum temperature of 90 degrees there is created a condition which tends to the destruction of the anaerobic bacteria which flourish and develop at the 90-degree optimum temperature. This destruction is so great that when the higher optimum temperature for the thermophilic digestion is reached, there are substantially destroyed the bacteria or organisms which would otherwise develop and flourish at the optimum temperature for non-thermophilic digestion. But this higher temperature does not destroy bacteria or bacterial spores which would develop acid fermentation upon a substantial drop in general temperature. Thus it is to be appreciated that if for any reason the temperature of the mass normally undergoing thermophilic digestion should be dropped substantially below the 130-degree optimum temperature, the anaerobic bacteria which would normally develop and flourish under the 90-degree Fahrenheit temperature having been destroyed and acid forming bacteria or spores not having been destroyed, that the sludge would shortly be converted from an alkaline condition into an acid condition and thus become what is frequently termed "sour" or in a state of fermentation.

While non-thermophilic digestion of sludge has become quite common and practical, nevertheless the thermophilic digestion of sludge has never come into commercial practice, and some of the probable explanations therefor are as follows:

The sludge derived from the thermophilic digestion and the sedimentation operation carried out during such digestion as heretofore tried in a relatively experimental way, while sometimes having no predominating odor other than the tarry odor of ripe sludge, is sticky, gummy and difficult to dewater either by placement upon sand filtering beds or sand drying beds or when introduced into a mechanical filter. In other words, the resulting sludge tends to hold the substantial water content entrapped therein and results in a messy condition difficult to overcome.

As to the effluent from such thermophilic digestion as heretofore attempted, the same is exceedingly obnoxious and putrescible, thereby introducing an objectionable factor which it is difficult to overcome, as a practical matter.

Another and highly objectionable factor in respect to thermophilic digestion as heretofore proposed, has been the fact that if such digestion were to be used it had only been contemplated to carry out the entire digestion and sedimentation in a single body, and if for any reason the thermophilic digestion became interrupted due to failure to maintain and control the proper heat, or failure to maintain an alkaline condition necessary for the proper forming thereof, then the entire batch or body of sewage undergoing digestion would turn sour, thus upsetting the entire process and creating a condition which might require the emptying of the digestion tank and thereafter starting up anew, or at least would require an unknown or impractical mode of treatment to bring the same back into proper operative condition.

These objectionable features are of sufficient character and importance to deter consulting engineers and others of technical responsibility from recommending or even seriously suggesting the employment of apparatus for the performing thereof.

Against this, however, it is pointed out that thermophilic digestion has the advantage of performing an equivalent degree of digestion in much less time than is possible in non-thermophilic digestion, for example, with a properly seeded mixture or with a properly initiated process. It is fair to expect in practical operation a relatively complete digesting of sludge when exposed to anaerobic non-thermophilic bacterial activity within a minimum period of between twenty to thirty days, while against this it is fair to expect a relatively complete digesting of the same sludge when exposed to anaerobic thermophilic bacterial activity within a period of between two to five days. Thus it will be manifest, if a process relying largely upon the thermophilic digestion can be employed, that one can expect a consequent lessening of the actual time required for digestion as compared with processes employing only non-thermophilic digestion; also as a consequence, that for the same ultimate digesting capacity, a plant employing thermophilic digestion can be substantially smaller in volume than one employing only non-thermophilic digestion.

The process and apparatus of the invention herein outlined have been developed having in mind the above recited facts, and having in view the overcoming of defects which have been inherent in respect to thermophilic digestion processes as heretofore proposed but which, as for reasons indicated above, have never come into practical or commercial use.

According to the present invention, the sludge is subjected during an initial treatment thereof within an approximate temperature range of 120 to 140 degrees Fahrenheit—130 degrees Fahrenheit being considered optimum temperature for thermophilic bacterial activity for most sludges—and for a sufficient length of time to effect a substantial digestion of a large or major portion of the digestible solids content of the sludge. This initial treatment is carried out in a body of sludge which is maintained in an alkaline condition and which is relatively small, to wit, a body of sludge which may be only large enough to provide, for example, a two- to five-day minimum detention period for the sludge undergoing treatment. Under these conditions it will be noted that the sludge will pass from this relatively small body while the anaerobic thermophilic digesting thereof is still active. From time to time, and preferably according to operative requirements, respecting the plant as a whole, some of this digesting sludge is passed to and into a relatively large body of sludge, to wit, a body which should be sufficiently large to provide for a twenty- to thirty-day minimum detention period. As previously indicated, this larger body of sludge should be maintained in an alkaline condition and incoming sludge from the smaller heated body undergoing thermophilic digestion either prior to or upon introduction into the larger cooled body is cooled so that the approximate maintained temperature range for the larger body is between eighty to ninety degrees Fahrenheit—an optimum temperature therefor being approximately 90 degrees Fahrenheit. Within this larger body the sludge thereof—including that from time to time supplied thereto—is exposed to anaerobic non-thermophilic bacterial activity whereby there is carried out what is referred to as anaerobic non-thermophilic digestion. This larger body is maintained in a relatively quiescent condition whereby sedimentation can take place, with the result that the solid matter ultimately resulting from the digestion settles as a ripe or completely digested sludge in the lower portion thereof, leaving the liquid content of the digested sludge as a relatively clear supernatant.

This anaerobic non-thermophilic digestion is preferably carried out in a suitably constructed tank or basin, for example, in a sedimentation tank of the Dorr type, by which the sedimenting sludge can be raked from the diverse sections of the basin to a place and means for the suitable discharge thereof, and the clarified effluent can pass from the tank or basin as a relatively clear unobjectionable clarified effluent which can be disposed of without unduly complicated methods of treatment or handling. In this manner objectionable characteristics of the supernatant or effluent are avoided, and the resulting sludge is of a non-sticky character that permits the ready dewatering and relatively easy handling incident to the disposal thereof.

The large body of sludge which is maintained alkaline, and which is very easily maintained alkaline during normal operating conditions, is available and can be relied upon for introduction into the smaller body of sludge to overcome or correct any tendency of the smaller body of sludge to become acid or septic as, for example, incident to improper operation.

It will therefore be seen that provision is made whereby the larger body of alkaline sludge can be relied upon as a corrective readily available for employment, thus overcoming the former objection that thermophilic digestion is dangerous and unreliable.

The invention according to one aspect or phase thereof revolves about sludge treatment according to which thermophilic digestion is carried out as an initial stage or step, and non-thermophilic digestion is carried out as a subsequent stage or step.

The invention according to another aspect or phase thereof revolves about the exposing of sludge to anaerobic thermophilic digestion in a relatively small body of sludge as an initial step or stage, and in the passing of the sludge from this initial stage into a larger body of sludge undergoing sedimentation and which is maintained in an alkaline condition, and which can be relied upon for correcting any tendency towards acidity in the small or initial body of sludge or of any acid condition which for any reason might become existent in the small or initial body of sludge.

An object of this invention is to so treat, process and handle the sludge that the aspects or phases herein referred to can be realized and carried out.

Another object of the invention is to provide an apparatus or system suitable for realizing and performing features and steps necessary in carrying out the novel treatment and process herein disclosed.

One object of the invention is to treat sludge so as to obtain a relatively quick digestion, and consequent gas production, of a major portion of the solids content of the sludge, and to take advantage of the relatively quick digestion incident to anaerobic thermophilic digestion.

Another object of the invention is to so treat sludge that thermophilic digestion can be employed as an initial step or stage thereof, and so that as a secondary or subsequent digestion stage there can be completed the sludge digestion operation and whereby there can be concurrently carried out an accompanying sedimentation operation according to which there will result a sludge containing the ripe or digested solids which will be of a relatively unobjectionable character and which will readily respond to dewatering; also which will result in a clarified effluent that is relatively innocuous and unobjectionable and which permits a relatively ready disposal thereof without treatment or without any practically prohibitive degree of treatment or mode of handling, should further treatment or special mode of handling for any reason be deemed advisable.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawing there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawing.

The sole figure of the accompanying drawing diagrammatically illustrates, in operative association and arrangement, the instrumentalities in and by means of which the invention hereof can be carried out and realized. Therein a raw sewage supply which enters the system along the path 1 is introduced into a sedimentation tank 2 having a sludge raking mechanism 3 of the Dorr type and an effluent overflow launder 4 and a conduit 5, by means of which the raw clarified effluent passes from the system.

The raw sludge, which is sometimes referred to as fresh sludge and sometimes as untreated sludge, collects in the bottom of the sedimentation tank or basin 2, is collected and transferred by the raking mechanism 3 to a sludge discharge section 6, and therefrom it is passed through a conduit 7 having therein a sludge pump 8. This conduit 7 as shown includes a heat interchanging section 9, constituting part of a heat exchanger H, whereby, if desired, waste heat can be imparted thereto while the fresh sludge is in transit on its way to what may be referred to as the initial or primary digester 10.

The sinuous shaped pipe section 9 which is within the heat exchanger H may be viewed as providing a forward flow portion of the heat exchanger since it provides a portion through which the incoming fresh sewage flows forwardly toward the primary digester. The hollow interior section or portion of the heat exchanger that immediately surrounds the exterior of said sinuous pipe section 9 provides what may be referred to as the backward flow portion of heat exchanger since it provides a portion through which sludge from the primary digester flows backwardly or counter to the inflowing fresh sludge. The consequence of this counter flow is a prewarming or heating of the forwardly flowing incoming fresh sludge and a cooling or partial cooling of the backwardly flowing sludge as it passes from the primary digester to the secondary digester wherein further cooling takes place.

This primary digester 10 is preferably of the closed type thus providing a construction whereby the combustible gas resulting from the digestion carried out therein can be collected for ultimate use. This initial digester is provided with a heating coil or pipe 11 which is in series with a section 12 that is heated by gases of the sludge digestion process and which are conveyed from the interior of the initial digester 10 by the pipe 25 and branch 13 thereof that leads to a gas burner 14 of what may be considered as the heating stove or means 15.

The heating means just described is relied upon for maintaining the temperature conditions of the sludge within the digester 10 within a range of approximately 120 to 140 degrees Fahrenheit whereby and within this digester the thermophilic digestion is realized. The optimum temperature for thermophilic digestion is, as has been previously indicated, approximately 130 degrees Fahrenheit.

A mixing and agitating means 16 is provided for insuring a relatively uniform and homogeneous condition within the initial digester 10 whereby a relatively uniform temperature condition as well as a relatively homogeneous mixture condition may be maintained and insured throughout the body of liquid which is being subjected to thermophilic digestion, or which may be described from another point of view as exposed to the action of thermophilic organisms whereby a substantial anaerobic thermophilic digestion of the solids content thereof will follow.

As has heretofore been pointed out, it is necessary—if the thermophilic digestion is to be properly carried out—that the body of sludge undergoing such digestion be in an alkaline condition.

From the initial digester or initial treating tank 10 the sludge passes or is passed to a subsequent tank or basin 17 which may be either of the open or closed type. In the construction shown, this tank is in the form of a relatively closed-top digester. It functions, however, as a sedimentation tank. It may be provided with an inverted cone-shaped bottom of sufficient slope to permit the gravitation of settled sludge from the lower interior portion of the tank to and into a discharge opening or section as 18 by which the settled sludge may be delivered or passed from the tank 17, or it may be of a construction such as will provide a sedimentation tank of the Dorr type according to which a raking mechanism may be employed and relied upon for collecting settled sludge and for transferring the sludge collected thereby to a discharge opening or section by which the settled sludge thus collected and transferred may be delivered or passed from the tank.

The tank 17 is sometimes referred to as the subsequent digester. It may be properly referred to as a holding tank or basin or as a sedimentation tank or basin because of its also functioning in that capacity.

The initially treated sludge passes from the initial digester 10 along the path 20 into the section 21 of the heat exchanger H, thence along the path 23 and ultimately through the discharge section 24, thus providing a continuous conduit or pathway from the interior of the initial digester tank 10 to the interior of the subsequent digester or sedimentation basin 17.

The passage of raw sludge from the sedimentation basin 2 to and into the initial digester 10 takes place from time to time according to operative requirements and the construction is also such that a flow of sludge from the initial and heated body of thermophilic digesting sludge to and into the larger and cooled body of sludge within the subsequent digester or sedimentation basin 17, follows as a consequence of the introduction of the raw or fresh sludge into the tank 10.

The gas receiving portions of the initial digester 10 and of the closed subsequent digester 17, are in communication with each other through the communicating pipe or passageway 25 whereby the same pressure conditions exist in both.

An outflow pipe leading from the upper interior portion of the subsequent digester 17 is provided as by an inverted siphon or overflow pipe construction 26 that is arranged to permit an outflow as clarified effluent of the supernatant from the upper interior portion of the subsequent digester or sedimentation basin 17. Usually during the normal operation of the system the amount of this clarified effluent that passes from the tank or basin 17 through the overflow pipe 26 is in accordance with the amount of digesting sewage sludge as passed from the initial or thermophilic digester 10 to and into the subsequent or non-thermophilic digester 17 incident to the feed of raw sludge to and into the initial digester 10.

The tank or basin 17 is provided with cooling coil 27, which in the construction shown is in communication with the pipe 5 through the medium of the pipe that includes the valve controlled section 28, the pump 29 and the section 30 leading to and provided for delivering clarified effluent into the cooling coil 27 whereby, according to operative requirements, the clarified effluent thus derived from the sedimentation tank 2 can be relied upon, and in fact is relied upon, for effecting the proper cooling and for maintaining in the proper temperature-condition the sludge within the tank or basin 17. The effluent which has been diverted from the pipe 5 by the pump 29 and thereby into the cooling coil 27 ultimately passes from the cooling coil through the pipe 31 to and into the feed pipe 1 of the sedimentation tank 2. By this arrangement the heat thus absorbed by the cooling water is thus conducted into the sedimentation tank 2. The heat thus introduced is an aid to and is helpfully employed in the sedimenting operation that takes place in the sedimentation tank or basin 2.

In certain instances it is advantageous to return some settled sludge to incoming sewage whereby the returned sludge can be employed as an aid in furthering the settling of the organic matter from raw sewage when the latter is subjected to sedimentation and, having that point in mind, the apparatus illustrated is provided with a valve-controlled pipe section 44, pump 45, and pipe section 46 leading from the sludge discharge pipe or conduit 7 to the sewage feed conduit 1 of the sedimentation unit.

The sludge within the basin 17 for optimum operating conditions, should be maintained within a temperature range of approximately 80 to 90 degrees Fahrenheit, an approximate temperature of 83 degrees Fahrenheit being deemed to be an optimum temperature for this place, and in this tank 17 the non-thermophilic digestion is carried out whereby the digesting operation as to the organic solids within the sludge can be completed or can be carried to that degree of completion as desired.

Quiescent conditions exist and are maintained within this tank 17 and therefore there follows effective sedimentation of the solids resulting from the digesting operation therein. The resulting sludge is what may be referred to as a ripe or digested sludge and from time to time is withdrawn.

For proper operation, the body of sludge within the tank 17 should be maintained alkaline whereby the anaerobic non-thermophilic digestion can take place. As has previously been pointed out, the body of sludge undergoing the subsequent digestion or sedimentation treatment in tank 17 is maintained in an alkaline condition and, being relatively large, it can thus be relied upon for use as a corrective in case the smaller body of sludge in the digester 10 should tend to change from an alkaline to an acid condition or, if for any reason, the smaller body of sludge should become changed to an acid condition. To that end a return or recirculating system that includes pipe section 34, pump 35, valve-controlled section 36, is provided. A valve-controlled pipe section 37 leads from the system and is provided as the means by which ripe or digested sludge solids are eliminated or removed. Said pump 35 and the valve-controlled section 36 can be relied upon when the valve thereof is open for the transferring of alkaline sludge as a corrective from the tank 17 holding the large body of alkaline sludge undergoing non-thermophilic digestion to and into the smaller initial digester 10.

It is sometimes advisable and practical to introduce into incoming sludge prior to its entry into a particular digester, sludge which can serve as a seeding sludge, to wit, a sludge undergoing digestion in the particular digester involved. To that end a valve-controlled pipe section 40, pump 41 and pipe section 42 are supplied between the pipe section 20 that leads from the interior of the initial digester or tank 10 on the one hand, and the raw sludge supply section or conduit 7 leading to the interior of the digester 10 on the other hand, and by this pumping means anaerobic thermophilic digesting sludge can be passed from the tank 10 and be introduced into the incoming raw or fresh sludge while the latter is on its way to the tank 10 in a manner whereby the raw and the thus introduced digesting sludge is effectively mixed before being introduced, or re-introduced as the case may be, into the digester 10. Likewise, the pipe section 34, pump 35, pipe section 36 and a valve-controlled pipe section 43, can be relied upon for the conducting of sludge to serve as seeding sludge, from the interior of the subsequent digester or tank 17 to and into the sludge en route thereto through the pipe section 23.

It is believed that the general operation of the apparatus or system will be relatively clear from that which has preceded. Nevertheless, a short statement as to the operation is inserted at this time:

The raw sewage enters the system through the feed pipe 1, is subjected to sedimentation in the sedimentation tank or basin 2, the solids content thereof settling as raw sludge which is collected in any suitable manner as by the raking mechanism 3 whereby it can pass from the sedimentation tank to the discharge section thereof and therefrom by means of the pump 8 and conduit 7 into the initial digester 10. The upper portion of the supernatant from which the solid content has been settled in the sedimentation tank 2 overflows into the effluent launder 4 and is conducted therefrom through the discharge pipe or conduit 5 by which all or a certain portion thereof is disposed of as by passing to waste or any other place desired.

It has heretofore been pointed out that a means for heating the sludge within the initial digester is provided and that the heating means referred to comprises the heating coil 11. Through the instrumentality of this heating coil the temperature within the initial or thermophilic digester is raised to and maintained at a temperature range of between 120 to 140 degrees Fahrenheit, thus providing relatively optimum temperature conditions which are favorable to the carrying on of the thermophilic digestion therein. The storage capacity of this digester is sufficient to provide a two- to five-day detention period for the sludge supplied thereto, and during this detention period the sludge is exposed to anaerobic thermophilic digestion under conditions which effect a substantial digesting of the solid content of the sludge.

If desired, there can be effected a preliminary heating of the raw sludge while on its way to the initial digester by causing a countercurrent flow through the heat exchanger H of the cold raw incoming sludge on the one hand, and the hot digesting sludge flowing on its way from the initial digester 10 to the subsequent or secondary digester 17 on the other hand. Where a heat exchanger H is thus employed it can also be relied upon to effect certain lowering of the temperature of the initially treated sludge so as to cause it to more nearly approach the maintained temperature range of the secondary digester 17.

In the secondary digester 17, the temperature range, as previously indicated, is approximately between 80 to 90 degrees Fahrenheit, whereby temperature conditions are maintained favorable to the carrying out of the non-thermophilic digestion or mesophilic digestion, to which the sludge is subjected as a second stage or step in the treatment of the sludge.

To maintain and control the desired temperature within this secondary digester 17, there is provided the means comprising the cooling coil 27 whereby the clarified effluent from the sedimentation tank 2 can be and is relied upon to bring down the temperature of the sludge and to maintain the sludge in the temperature proper for the non-thermophilic digestion just referred to. Also, as previously mentioned, the heat is introduced into the sedimentation tank or basin 2 by returning to the sedimentation basin the cooling liquid which has taken on heat incident to its cooling operation, thus providing heat which favors and aids the particular sedimentation operation that is carried out in said sedimentation tank or basin 2.

As previously indicated, it is preferable to have the subsequent digester 17 substantially larger than the initial digester 10. In other words, it is preferable that the subsequent digester tank or basin 17 be large enough to provide at least a twenty-day and up to a thirty-day detention period for the sludge undergoing treatment where there is not contemplated provision of sludge storage beyond that detention period necessary for the proper continuance and degree of the sludge digestion; however, if substantial sludge storage—beyond that required for the proper sludge digestion—is desired, then the digestion tank or basin 17 may be large enough to provide capacity equal to that requisite for a thirty- to sixty-day detention period.

In the normal operation of the digester units referred to, the sludge is in an alkaline state, such state being necessary where anaerobic digestion is carried out.

Reference has heretofore been made to the fact that the thermophilic digestion is carried out under conditions which tend to destroy or eliminate certain anaerobic bacteria that would otherwise develop upon a lowering of the temperature substantially below the 120-degree temperature mentioned and that, if care is not exercised, it is very easy for the sludge in the initial digester tank 10 to go "sour", that is, to take on an acid characteristic. The condition just described is one that would come into existence or would be likely to come into existence (a) if the digester tank 10 were allowed to cool and stay cool any length of time, and also (b) if an abnormal amount of acid sludge were introduced into the digester tank 10 for treatment. Having such difficulty in mind, provision has been made whereby the alkaline sludge from the subsequent digester tank 17 can be passed into the initial digester tank 10 as a corrective for any abnormal tendency to, or state or condition of acidity, and which must be avoided or overcome.

The means for passing the corrective sludge from the tank 17 to the tank 10 includes the pump 35 and the valve-controlled pipe line 36.

The process herein described can be initiated in several ways. One of these will now be referred to:

Sludge in an alkaline condition can be introduced to the normal height in both the initial and subsequent digester tanks 10 and 17, and the temperature in said tanks can be caused to come within a range approximately 80 to 90 degrees Fahrenheit, to wit, arranged favorable to non-thermophilic digestion. The circulating of the sludge as between the tanks from the one to the other can be carried out until non-thermophilic digestion has been substantially initiated. Then the circulating as between the tanks can be eliminated, or substantially so. Heat can then be applied through the coil 11 to bring the temperature of the sludge content within the initial digester tank 10 to within the temperature range of approximately between 120 to 140 degrees Fahrenheit—it is preferable to bring the temperature to approximately 130 degrees Fahrenheit, which is the optimum temperature for thermophilic digestion. During this heating it is advisable to circulate or agitate the sludge within the digester tank 10. In due course of time the thermophilic digestion will start and substantially develop, and when the thermophilic digestion has devolped to the point required, it will then be in order to conduct the process as described as proper for the normal operation thereof.

In the initiating of the process, it will be an aid and may be in order to employ a culture or seeding material which can be relied upon to properly initiate either the thermophilic digestion or the non-thermophilic digestion as the case may be. Cultures and modes of producing cultures for initiating either thermophilic or non-thermophilic types of sewage sludge digestion are known to bacteriologists familiar with the digestion of sewage sludges.

Applicant believes that the process and apparatus herein described overcome the objections and difficulties heretofore existent in conjunction with processes of sludge digestion involving thermophilic bacterial action as heretofore proposed, and that he is the first to propose the carrying out of an initial sludge digestion in a relatively small body of sludge having alkaline characteristics and wherein bacterial flora or organisms exist favorable to the insuring of anaerobic thermophilic digestion, and wherein the thermophilic digesting sludge is withdrawn and passed to a considerably larger body of alkaline sludge maintained at a lower temperature, to wit, within a temperature range of approximately between 80 and 90 degrees Fahrenheit, and wherein there exists bacterial organisms or flora favorable to the carrying on of a non-thermophilic digestion of the sludge, and which larger body of alkaline sludge can be or is relied upon or is provided for use as a corrective should, for any reason, the smaller body of sludge tend to acid characteristics or take on acid characteristics.

The foregoing clearly describes a method, and an apparatus or system for performing the method, according to which the sludge is subjected to anaerobic thermophilic bacterial activity during an initial treatment or stage thereof within an approximate temperature range of 120 to 140 degrees Fahrenheit and for a sufficient length of time to effect a substantial degree of digestion of or for the major portion of the digestible solids content of the sludge, and according to which the thus initially treated sludge is caused to accumulate into a relatively large body, is held in such relatively large body within a substantially lower temperature range, namely, within an approximate temperature range of 80 to 90 degrees Fahrenheit, and is subjected to anaerobic non-thermophilic bacterial activity during a secondary or subsequent treatment or stage which may be referred to as a secondary digesting or holding stage. It is within and during this secondary stage that the digesting of the initially treated sludge is completed. Also, while thus held or stored, this large body of sludge is purposely maintained in an alkaline condition so as to be favorable to the completion of anaerobic digestion and also so as to be available for use as an acid corrective. While thus held sedimentation is taking place, and the solids resulting or remaining after the digestion deposit or settle as a sludge which is relatively innocuous and can be withdrawn and placed upon a drying bed without objectionable effects. Also, as the result of the new process, there can be realized and withdrawn from the subsequent or secondary digester and from the sedimentation operation just referred to, an effluent which is relatively clear and which is furthermore devoid of objectionable characteristics.

In certain cold climates there may be periods during which it may be advisable to employ as heating coils the coils 27 which have heretofore been referred to as cooling coils, and having that contingency in view, provision is made for supplying the heat requisite for that purpose by means of the heater collectively designated as 56. As part of the heating installation and for the purpose just mentioned, piping in the form of a bridge piping is provided between the pipe line 31 leading from the coils 27 and the pipe line 28 leading to the coils 27. It is to be noted that in the pipe line 31 there is a valve 31A and that in the pipe line 28 there is a valve 28A, and that one end of the section of the bridge piping, to wit, the section 51 thereof is connected to the pipe line 31 at a point between the coils 27 and the valve 31A, and that the other end or section of the bridge piping, namely, section 53 thereof, is connected to the pipe line 28 at a point between the valve 28A and the coil 27. As a matter of fact, this bridge piping includes the section 51, having a valve 51A therein, heated section 52 and the section 53 having the valve 53A therein.

It is also to be noted that the pump 29 heretofore described is located between the connection of the section 53 to the pipe line 28. When the valves 53A and 51A are both closed, and the valves 28A and 31A are both open, pump 29 can be relied upon to pass cooling liquid to the coils 27 whereby they will function in that capacity. The pump 29, however, is also so located that by having valves 28A and 31A closed, and the valves 53A and 51A open, the pump 29 can then be relied upon to circulate the liquid heated by heater 56 from the heating section thereof through the pump, thence into the coils 27 and therefrom, by means of a section of the pipe 31 and pipe section 51, back into the heated section 52 of the heater 56, with the result that the coils 27 can function as heating coils.

The heater has any suitable form of burner as 55, which is provided with gas developed by the process and passed thereto to the valve control pipe 54 which is connected to the gas pipe line 25 heretofore described.

It will furthermore be manifest that by only partially opening the valves 51A and 53A on the one hand, and either or both of the valves 28A and 31A on the other hand, modification of the operating conditions can be established according to the operative requirements desired for a particular period.

It is to be noted that a valve 7A is provided in the pipeline 7 leading from the tank or basin 2 to and from the pump 8, thence to the thermophilic digester 10; that the pipe 36 heretofore described as being provided for the return of sludge is connected to the pipeline 7 between the pump 8 and the valve 7A; that valves 36A and 36B are provided in the pipeline 36; that a valve 23A is provided in the line 23; and that a valve 43A is provided in the cross pipe connection 43 leading from pipe 36 to pipe 23.

In the normal operation of the system—to wit, under conditions according to which the primary digester 10 is operating as a thermophilic digester and the digester 17 is operating as a mesophilic digester—the valve 7A is open, the valves 36A and 36B are or may be open, the valve 43A is or may be closed, and the valve 23A is open. If, however, conditions should come into existence according to which it is desirable to temporarily pass sludge direct from the basin 2 to and into the basin or digester 17, then and in that instance, valve 36B is closed, valve 7A is closed, valve 23A is closed, valve 36A is opened, valve 43A is opened, and the flow of sludge is from the basin 2, past the pump 8, into the pipeline 36 according to the direction indicated by the broken arrows past valve 36A, thence through pipe 43, thence through that section of the pipe 23 leading to section 24, whereby the raw sludge from the basin or tank 2 is delivered into the basin or digester 17.

In this manner the digester 17 can operate (a) As a sole digester until the digester 10 is in operation according to the particular process desired, or (b) During the establishing of corrective operating conditions within the digester 10, and particularly in the overcoming or avoiding of acid characteristics in the smaller body of sludge in the digester 10 should such acid condition tend to develop or exist.

In case the smaller body of sludge should tend to take on acid characteristics as, for example, (a) Following cooling due to a considerable lapse of attention on the part of an operator, or by difficulties in the heating system or insufficient gas production, whereby the body of sludge in the digester 10 might become sufficiently cooled, and might be allowed to remain cooled for a sufficient time for the smaller body of sludge therein to turn sour, or (b) Following an excessive introduction of acid sludge, to wit, in quantities sufficient to deplete the alkaline sludge and to overcome the alkaline characteristics of the sludge in digester K, thus arresting thermophilic digestion and allowing and causing the sludge in digester 10 to turn sour, or (c) Following any other abnormal cause whereby the thermophilic digestion in digester 10 becomes arrested, and whereby an acid condition comes into being which prevents the starting up of the thermophilic digestion until some positive step is taken to overcome the acid conditions, then, and in these events, the larger body of alkaline sludge of basin 17 can be relied upon to counteract or be employed in combatting the abnormal acid conditions experienced in digester or basin 10, in any one of several ways, among which there may be mentioned the following:

One of such ways involves the supplying to the sludge body within the digester 10 of heat in sufficient quantities to insure the maintaining of that body well within the temperature range favorable to thermophilic digestion and in transferring—in effect, recirculating—sludge having an alkaline characteristic from the large body of sludge within the basin or digester 17 to and into the smaller body of hot sludge within the basin or digester 10, until the alkaline characteristics are imparted to the sludge in digester 10. As indicated, it is important that during this entire reconditioning period the sludge within the digester 10 be maintained well within the thermophilic digestion temperature range. In this manner conditions favorable to the thermophilic digestion are established and maintained.

Another way involves the allowing of the temperature conditions within the digester 10 to be within temperature ranges favorable for anaerobic mesophilic digestion, a digestion which is herein indicated as carried out on sludge while in an alkaline condition, and in the transferring, that is, in the recirculating of sludge having an alkaline characteristic, from the basin 17 to and into the smaller body of sludge in the digester 10.

Ultimately when the transfer from basin 17 into the digester 10 is sufficient to impart to the sludge within the digester 10 alkaline characteristics in place of the undesirable acid characteristics, then and at that time, anaerobic alkaline mesophilic digestion can and will take place in the digester 10, with the result that in both the digester 10 and the larger digester or basin 17 anaerobic mesophilic digestion will follow.

According to a third procedure, the raw incoming sludge from the tank or basin 2 can be introduced directly into the large basin or digester 17, and mesophilic anaerobic digestion can be carried out thereupon. During this period there can be a gradual discharge of the sour sludge from the small digester into the large basin 17 but in a manner whereby the operating conditions of digester 17 will not be upset.

According to another procedure, by a proper adjusting of certain of the valves it is feasible to introduce some of the raw sludge directly into the digester 17, and some of the raw sludge into the digester 10, with a consequent displacement of some of the sludge from the digester 10, so that the sludge thus displaced will pass into the digester with the raw sludge passing thereto. It will be manifest that by the valve and piping arrangement described, many modifying modes of operation are possible whereby correct and desired operating conditions can readily be established and maintained.

What is claimed is:

1. In the treating of sludge derived from sewage, trade wastes and other polluted waters, the method which comprises subjecting the sludge to anaerobic thermophilic organism activity in an initial digestion stage at a temperature above 120 but not substantially above 140 degrees Fahrenheit for a sufficient length of time to effect a substantial digestion of the major portion of the digestible solids content of the sludge, transferring sludge from the initial digestion stage, and thereafter subjecting it to anaerobic mesophilic organism activity by introducing the transferred sludge into a body of sludge undergoing an anaerobic mesopholic secondary digestion stage wherein the sludge undergoing the secondary digestion stage is maintained at mesophilic temperatures not substantially exceeding 90 degrees Fahrenheit.

2. The digesting of sludge derived from sewage, trade wastes and other polluted waters by a process comprising subjecting the sludge to the action of a group of anaerobic thermophilic organisms for the primary digesting of the sludge at temperatures preferably above 120° F., and thereafter subjecting it to the action of a group of anaerobic mesophilic organisms for the secondary digestion of sludge at temperatures not substantially exceeding 90° F.

3. In the treating of sewage sludge, the method which comprises establishing an initial relatively warm body of sludge wherein anaerobic thermophilic digestion is realized and is carried out as an initial digestion stage in the sludge treatment, directing fresh sludge from time to time according to operative requirements toward and into said initial body of sludge, withdrawing sludge from said inital body while the same is actively undergoing anaerobic thermophilic digestion, introducing some of the thus withdrawn sludge as anaerobic thermophilic seeding sludge into the fresh sludge while the latter is on its way to and prior to its introduction into the initial body of sludge, establishing a subsequent relatively cool body of sludge wherein anaerobic mesophilic digestion is realized and is carried out as a subsequent digestion stage in the sludge treatment, directing sludge from the initial body from time to time according to operative requirements toward and into the subsequent body, withdrawing sludge from the subsequent body and while the latter is actively undergoing mesophilic digestion introducing the same as anaerobic mesophilic seeding sludge into the sludge from the initial body while the latter is on its way to and prior to its introduction into the subsequent body.

4. In the digesting of sludge derived from sewage, trade wastes and other polluted waters the method comprising from time to time supplying such sludge and subjecting it to the action of a thermophilic group of organisms within a maintained primary body of sludge actively undergoing anaerobic thermophilic digestion carried out at temperatures above 120° F. but not substantially above 140° F., from time to time according to the quantity of inflowing sludge being supplied to the primary body transferring a corresponding quantity of sludge from said primary body to a maintained secondary body of sludge actively undergoing anaerobic mesophilic digestion carried out at temperatures not substantially exceeding 90° F. and under conditions that permit further liquefaction and gasification of the digested solids in the sludge, and heating the sludge being supplied to the primary body while cooling sludge undergoing transfer from the primary body to the secondary body by passing said sludges sufficiently proximate each other whereby there is effected a transfer of heat to the sludge being supplied from the sludge undergoing transfer.

5. In the treating of sewage, trade wastes and other impure waters the method which comprises subjecting the impure waters to a clarifying operation by sedimentation, collecting the resulting settled sludge and passing the same along a path leading to and into a primary body of sludge undergoing anaerobic thermophilic digestion at temperatures above 120° F. but not substantially above 140° F. whereat the incoming sludge is exposed to and undergoes an anaerobic thermophilic digestion stage, passing sludge from said primary body to and into a secondary body of sludge undergoing an anaerobic mesophilic secondary digestion at temperatures within an approximate range of between 80° and 90° F. and whereat the sludge passed thereto is exposed to and undergoes an anaerobic mesophilic digestion stage, passing clarified supernatant liquid effluent from the clarifying operation and diverting a portion of the effluent along a path sufficiently proximate the secondary body of sludge for effecting an indirect transfer of heat from the sludge of the secondary body of sludge to said diverted portion of the clarified effluent and for thereby indirectly cooling the sludge of the secondary body to within the required lower temperature range and maintaining the sludge cooled to within the lower temperature range that is favorable to anaerobic mesophilic digestion, and returning the diverted portion of the effluent thus heated incident to its said employment as a cooling medium to and into incoming raw sewage whereby the thus returned heat aids in the clarifying operation.

6. In the treating of sludge having digestible organics therein and derived from sources such as sewage, trade or industrial wastes or other impure waters the method which comprises establishing a primary body of sludge and normally maintaining the same at temperatures sufficiently high to be favorable and conducive to a bacterial digestion stage wherein the organics of the sludge are continuously undergoing an anaerobic thermophilic biologic digesting operation, establishing a subsequent body of sludge and maintaining the same alkaline at temperatures below that requisite for thermophilic digestion but at temperatures within ranges sufficiently low to be favorable and conducive to a non-thermophilic bacterial digestion stage wherein the organics of the sludge are continuously undergoing an anaerobic mesophilic biologic digesting operation, intermittently introducing the sludge into the primary body, intermittently transferring portions of the sludge from the primary body into the subsequent body, and employing the alkaline sludge in the subsequent body as a corrective by transferring quantities of the alkaline mesophilic digesting sludge from the subsequent body to the primary body should the latter take on an acid characteristic.

7. In the treating of sludge having digestible organic matter therein a method comprising establishing an initial body of bacterial digesting sludge normally at elevated temperatures within an approximate temperature range of between 120° F. and 140° F. and under conditions favorable to the development and continual existence of groups of active anaerobic thermophilic organisms, establishing a subsequent larger body of bacterial digesting sludge and maintaining the same at lower temperatures of approximately not over 90° F. and under conditions favorable to the development and continual existence of groups of active anaerobic non-thermophilic organisms that yield a predominantly alkaline sludge, feeding sludge to be treated into the smaller body and thereby displacing a corresponding quantity and passing the displaced sludge into the subsequent larger body, and employing the alkaline sludge from the larger body as an adjuster by transferring quantities of the alkaline non-thermophilic digesting sludge from the subsequent larger body to the smaller initial body should the latter abnormally change from the alkaline toward the acid characteristic.

8. Apparatus for the digesting of sewage sludge and other putrescible matter according to a plural stage operation comprising, in combination, a primary digester having heating means associated therewith whereby the primary digester is provided for operating at a relatively high temperature, a secondary digester providing a sedimentation space in which a secondary digestion operation is carried out at a relatively low temperature as compared with that carried out in the primary digester, a heat interchanger comprising a forward flow portion and a backward flow portion, sludge feeding means leading to the primary digester and comprising as a part thereof the forward flow portion of the heat interchanger, means for conducting sludge from the primary digester to the secondary digester and comprising as a part thereof the backward flow portion of the heat interchanger whereby the sludge from the primary digester is cooled by the incoming fresh sludge.

9. Apparatus for digesting sewage and other putrescible sludges according to plural stage operation and comprising in combination a primary digester having heating means associated therewith whereby the primary digester is provided for operating at relatively high temperatures and within which a thermophilic type of sludge digestion is carried out as an initial stage, a secondary digester for operating at relatively low temperatures and providing a sedimentation space in which a mesophilic type of sludge digestion is carried out as a subsequent stage, sludge feeding means leading to the primary digester, means for conducting sludge from the primary digester to the secondary digester, and means for conducting sludge from the secondary digester to the primary digester whereby the transferred sludge can function to adjust conditions within the primary digester.

10. Apparatus for digesting sludges containing putrescible organic matter comprising in combination a primary digester for operating at a relatively high temperature, a secondary digester for operating at a lower temperature, a heat interchanger comprising a forward flow portion and a backward flow portion, sludge feeding means leading to the primary digester and comprising as a part thereof the forward flow portion of the heat interchanger, means for conducting sludge from the primary digester to the secondary digester and comprising as a part thereof the backward flow portion of the heat interchanger whereby sludge from the primary digester is cooled by the counter-moving inflowing sludge, and means for conducting sludge which is to function as a correcting and conditioning agent from the secondary digester to the primary digester.

11. In an apparatus for digesting sewage sludge and other decomposing putrescible matter by a two-stage operation, which apparatus comprises, in combination, a sedimentation basin, means for conducting thereto sewage to be subjected to sedimentation therein, a primary digester, means for conducting sewage sludge from the sedimentation basin to and into the primary digester, means comprising heating pipes within the primary digester for indirectly heating the contents of the primary digester, a secondary digester, a conduit for conducting sludge from the primary digester to the secondary digester, means comprising cooling pipes located within the secondary digester for indirectly cooling the contents of the secondary digester, and means for conducting some of the clarified effluent from the sedimentation basin through said cooling pipes thence to a position whereat the clarified effluent which is somewhat heated incident to its passage through the cooling coils is caused to enter the sedimentation basin and, because of the heating thereby supplied, thus be helpful in the performing of the sedimentation operation which is carried out in the sedimentation basin.

12. In the treating of sludge derived by sedimenting contaminated waters such as sewage, trade and industrial wastes having suspended digestible organic solids therein, the method which comprises creating and maintaining in an active state of anaerobic thermophilic biological digestion a primary body of such sludge heated above 120 degrees Fahrenheit but not substantially above 140 degrees Fahrenheit and in amount requisite for approximately a two to five days detention period for the sludge, creating and maintaining in an active state of anaerobic mesophilic biological digestion a secondary body of sludge at temperatures within a range of approximately 80 to 90 degrees Fahrenheit and in amount requisite for approximately ten to thirty days detention period for the sludge, from time to time according to operative requirements, supplying the sludge to be treated to the primary body wherein the organic solids of the sludge are exposed to and to a substantial extent undergo an anaerobic thermophilic biological digestion stage, and from time to time according to operative requirements passing sludge from the primary body to and into the secondary body wherein the organic solids in the sludge are exposed to and undergo an anaerobic mesophilic bacterial digestion stage.

ANTHONY J. FISCHER.